(12) United States Patent
Durant

(10) Patent No.: US 9,049,529 B2
(45) Date of Patent: Jun. 2, 2015

(54) HEARING AIDS AND METHODS AND APPARATUS FOR AUDIO FITTING THEREOF

(75) Inventor: Eric A. Durant, Milwaukee, WI (US)

(73) Assignee: Starkey Laboratories, Inc., Eden Prairie, MN (US)

(*) Notice: Subject to any disclaimer, the term of this patent is extended or adjusted under 35 U.S.C. 154(b) by 1055 days.

(21) Appl. No.: 12/651,154

(22) Filed: Dec. 31, 2009

(65) Prior Publication Data

US 2010/0172524 A1 Jul. 8, 2010
US 2014/0254841 A9 Sep. 11, 2014

Related U.S. Application Data

(63) Continuation of application No. 10/051,757, filed on Jan. 16, 2002, now Pat. No. 7,650,004, which is a continuation-in-part of application No. 10/001,229, filed on Nov. 15, 2001, now abandoned.

(51) Int. Cl.
*H04R 25/00* (2006.01)
*G06N 3/12* (2006.01)

(52) U.S. Cl.
CPC ............. *H04R 25/70* (2013.01); *G06N 3/126* (2013.01); *H04R 25/505* (2013.01)

(58) Field of Classification Search
USPC ........ 381/323, 312, 314, 60; 600/559; 706/13
See application file for complete search history.

(56) References Cited

U.S. PATENT DOCUMENTS

| | | |
|---|---|---|
| 3,527,901 A | 9/1970 | Geib |
| 4,366,349 A | 12/1982 | Adelman |
| 4,396,806 A | 8/1983 | Anderson |
| 4,419,544 A | 12/1983 | Adelman |
| 4,471,171 A | 9/1984 | Kopke et al. |
| 4,471,490 A | 9/1984 | Bellafiore |
| 4,637,402 A | 1/1987 | Adelman |
| 4,697,242 A | 9/1987 | Holland et al. |

(Continued)

FOREIGN PATENT DOCUMENTS

| | | |
|---|---|---|
| DE | 10053179 | 5/2001 |
| EP | 0396831 A2 | 11/1990 |

(Continued)

OTHER PUBLICATIONS

"U.S. Appl. No. 11/276,795, Advisory Action mailed Jan. 12, 2010", 13 pgs.

(Continued)

*Primary Examiner* — Disler Paul
(74) *Attorney, Agent, or Firm* — Schwegman Lundberg & Woessner, P.A.

(57) ABSTRACT

A field ready, unsupervised-use ready, method and apparatus for audio fitting a hearing aid is described in a hand held configuration having paired comparisons (hearing selections) stored in and derivable from a memory therein. The paired comparisons are presented one at a time to a user and a preferred selection for each paired comparison is made by a select indicator after the user toggles back and forth between the selections for as many times necessary in determining their preferences. A genetic algorithm converges all the preferences upon a single solution. Crossover and mutation genetic algorithm operators operate on a linear range of indexes representative of parametric values of the pairs. A fully integrated hearing aid having all the above described features incorporated therein is also presented.

21 Claims, 10 Drawing Sheets

(56) References Cited

U.S. PATENT DOCUMENTS

| | | | |
|---|---|---|---|
| 4,882,762 A | 11/1989 | Waldhauer | |
| 5,226,086 A | 7/1993 | Platt | |
| 5,390,254 A | 2/1995 | Adelman | |
| 5,434,924 A | 7/1995 | Jampolsky | |
| 5,502,769 A | 3/1996 | Gilbertson | |
| 5,553,152 A | 9/1996 | Newton | |
| 5,581,747 A | 12/1996 | Anderson | |
| 5,659,621 A | 8/1997 | Newton | |
| 5,687,279 A | 11/1997 | Matthews | |
| 5,706,352 A | 1/1998 | Engebretson et al. | |
| 5,724,433 A | 3/1998 | Engebretson et al. | |
| 5,757,933 A | 5/1998 | Preves et al. | |
| 5,793,644 A | 8/1998 | Koford et al. | |
| 5,822,442 A | 10/1998 | Agnew et al. | |
| 5,825,631 A | 10/1998 | Prchal | |
| 5,835,611 A | 11/1998 | Kaiser et al. | |
| 5,852,668 A | 12/1998 | Ishige et al. | |
| 5,862,238 A | 1/1999 | Agnew et al. | |
| 5,946,673 A | 8/1999 | Francone et al. | |
| 6,035,050 A | 3/2000 | Weinfurtner et al. | |
| 6,041,129 A | 3/2000 | Adelman | |
| 6,118,877 A | 9/2000 | Lindemann et al. | |
| 6,148,274 A * | 11/2000 | Watanabe et al. | 703/6 |
| 6,236,731 B1 | 5/2001 | Brennan et al. | |
| 6,240,192 B1 | 5/2001 | Brennan et al. | |
| 6,347,148 B1 | 2/2002 | Brennan et al. | |
| 6,366,863 B1 | 4/2002 | Bye et al. | |
| 6,389,142 B1 | 5/2002 | Hagen et al. | |
| 6,449,662 B1 | 9/2002 | Armitage | |
| 6,718,301 B1 | 4/2004 | Woods | |
| 6,879,860 B2 | 4/2005 | Wakefield et al. | |
| 6,885,752 B1 | 4/2005 | Chabries et al. | |
| 6,888,948 B2 | 5/2005 | Hagen et al. | |
| 6,925,555 B2 | 8/2005 | Chang et al. | |
| 7,006,646 B1 | 2/2006 | Baechler | |
| 7,149,320 B2 | 12/2006 | Haykin et al. | |
| 7,242,777 B2 | 7/2007 | Leenen et al. | |
| 7,283,638 B2 | 10/2007 | Troelsen et al. | |
| 7,283,842 B2 | 10/2007 | Berg | |
| 7,343,021 B2 * | 3/2008 | Takagi et al. | 381/313 |
| 7,349,549 B2 | 3/2008 | Bachler et al. | |
| 7,650,004 B2 | 1/2010 | Durant | |
| 7,869,606 B2 | 1/2011 | Fichtl et al. | |
| 8,359,283 B2 | 1/2013 | Baskent et al. | |
| 2001/0005420 A1 | 6/2001 | Takagi et al. | |
| 2001/0007050 A1 | 7/2001 | Adelman | |
| 2001/0033664 A1 | 10/2001 | Poux et al. | |
| 2001/0055404 A1 | 12/2001 | Bisgaard | |
| 2002/0076073 A1 | 6/2002 | Taenzer et al. | |
| 2003/0007647 A1 | 1/2003 | Nielsen et al. | |
| 2003/0112988 A1 | 6/2003 | Naylor | |
| 2003/0133578 A1 | 7/2003 | Durant | |
| 2004/0066944 A1 | 4/2004 | Leenen et al. | |
| 2004/0181266 A1 | 9/2004 | Wakefield et al. | |
| 2004/0190739 A1 | 9/2004 | Bachler et al. | |
| 2004/0202340 A1 | 10/2004 | Armstrong et al. | |
| 2005/0107845 A1 | 5/2005 | Wakefield et al. | |
| 2005/0111683 A1 | 5/2005 | Chabries et al. | |
| 2005/0129262 A1 | 6/2005 | Dillon et al. | |
| 2005/0281421 A1 | 12/2005 | Armstrong | |
| 2005/0283263 A1 | 12/2005 | Eaton et al. | |
| 2006/0093997 A1 | 5/2006 | Kearby et al. | |
| 2006/0153395 A1 | 7/2006 | Van Den Heuvel et al. | |
| 2006/0161391 A1 | 7/2006 | Inaba et al. | |
| 2006/0178711 A1 | 8/2006 | Patrick et al. | |
| 2006/0222194 A1 | 10/2006 | Bramslow | |
| 2006/0227987 A1 | 10/2006 | Hasler | |
| 2007/0009123 A1 | 1/2007 | Aschoff et al. | |
| 2007/0019817 A1 | 1/2007 | Siltmann | |
| 2007/0041589 A1 | 2/2007 | Patel et al. | |
| 2007/0076909 A1 | 4/2007 | Roeck et al. | |
| 2007/0135862 A1 | 6/2007 | Nicolai et al. | |
| 2007/0217620 A1 | 9/2007 | Zhang et al. | |
| 2007/0217629 A1 | 9/2007 | Zhang et al. | |
| 2007/0219784 A1 | 9/2007 | Zhang et al. | |
| 2007/0237346 A1 | 10/2007 | Fichtl et al. | |
| 2007/0276285 A1 | 11/2007 | Burrows et al. | |
| 2008/0019547 A1 | 1/2008 | Baechler | |
| 2008/0037798 A1 | 2/2008 | Baechler et al. | |
| 2008/0049957 A1 | 2/2008 | Topholm | |
| 2008/0107296 A1 | 5/2008 | Bachler et al. | |
| 2009/0154741 A1 | 6/2009 | Woods et al. | |
| 2011/0016065 A1 | 1/2011 | Chapelle et al. | |
| 2011/0055120 A1 | 3/2011 | Baskent et al. | |

FOREIGN PATENT DOCUMENTS

| | | |
|---|---|---|
| EP | 0537026 A2 | 4/1993 |
| EP | 0335542 B1 | 12/1994 |
| EP | 1256258 B1 | 3/2005 |
| JP | 2001-175637 | 6/2001 |
| WO | WO-9802825 A2 | 1/1998 |
| WO | WO-0021332 A2 | 4/2000 |
| WO | WO-03045108 A2 | 5/2003 |
| WO | WO-03045108 A3 | 5/2003 |
| WO | WO-2005002433 A1 | 1/2005 |
| WO | WO-2005018275 A2 | 2/2005 |
| WO | 2007020299 A2 | 2/2007 |
| WO | WO-2007045276 A1 | 4/2007 |
| WO | WO-2007112737 A1 | 10/2007 |

OTHER PUBLICATIONS

"U.S. Appl. No. 11/276,795, Final Office Action mailed Oct. 14, 2009", 15 pgs.

"U.S. Appl. No. 11/276,795, Non Final Office Action mailed May 7, 2009", 13 pgs.

"U.S. Appl. No. 11/276,795, Non-Final Office Action mailed May 27, 2010", 14 pgs.

"U.S. Appl. No. 11/276,795, Pre-Appeal Brief Request mailed Feb. 16, 2010", 4 pgs.

"U.S. Appl. No. 11/276,795, Response filed Sep. 8, 2009 to Non-Final Office Action mailed May 7, 2009", 10 pgs.

"U.S. Appl. No. 11/276,795, Response filed Dec. 14, 2009 to Final Office Action mailed Oct. 14, 2009", 10 pgs.

"European Application Serial No. 08253924.8, Office Action Mailed Feb. 12, 2010", 1 page.

"European Application Serial No. 02803615.0, Office Action mailed Aug. 9, 2010", 5 Pgs.

"European Application Serial No. 08253924.8, Search Report mailed on Jul. 1, 2009", 8 pgs.

Mueller, Gustav H, "Data logging: It's popular, but how can this feature be used to help patients?", The Hearing Journal vol. 60, No. 10,, XP002528491, (Oct. 2007), 6 pgs.

Preves, David A., "Field Trial Evaluations of a Switched Directional/Omnidirectional In-the-Ear Hearing Instrument", Journal of the American Academy of Audiology, 10(5), (May 1999), 273-283.

"U.S. Appl. No. 10/051,757, Final Office Action mailed Jun. 11, 2009", 24 pgs.

"U.S. Appl. No. 10/051,757, Final Office Action mailed Aug. 24, 2006", 5 pgs.

"U.S. Appl. No. 10/051,757, Non-Final Office Action mailed Jan. 13, 2006", 5 pgs.

"U.S. Appl. No. 10/051,757, Non-Final Office Action mailed Apr. 21, 2008", 19 pgs.

"U.S. Appl. No. 10/051,757, Non-Final Office Action mailed Sep. 21, 2007", 7 pgs.

"U.S. Appl. No. 10/051,757, Non-Final Office Action mailed on Nov. 14, 2008", 30 pgs.

"U.S. Appl. No. 10/051,757, Notice of Allowance mailed Mar. 16, 2007", 4 pgs.

"U.S. Appl. No. 10/051,757, Notice of Allowance mailed Oct. 5, 2009", 13 pgs.

"U.S. Appl. No. 10/051,757, Preliminary Amendment filed Mar. 22, 2002", 2 pgs.

"U.S. Appl. No. 10/051,757, Response filed Jan. 24, 2007 to Final Office Action mailed Aug. 24, 2006", 11 pgs.

"U.S. Appl. No. 10/051,757, Response filed Feb. 17, 2009 to Non-Final Office Action mailed Nov. 14, 2008", 16 pgs.

"U.S. Appl. No. 10/051,757, Response filed Jun. 9, 2006 to Non-

(56) References Cited

OTHER PUBLICATIONS

Final Office Action mailed Jan. 13, 2006", 13 pgs.
"U.S. Appl. No. 10/051,757, Response filed Jul. 21, 2008 to Non-Final Office Action mailed Apr. 21, 2008", 14 pgs.
"U.S. Appl. No. 10/051,757, Response filed Sep. 11, 2009 to Final Office Action mailed Jun. 11, 2009", 10 pgs.
"U.S. Appl. No. 10/051,757, Response filed Oct. 27, 2005 to Restriction Requirement filed Sep. 30, 2005", 11 pgs.
"U.S. Appl. No. 10/051,757, Restriction Requirement filed Sep. 30, 2005", 4 pgs.
"U.S. Appl. No. 10/051,757, Response filed Jan. 22, 2008 to Non-Final Office Action mailed Sep. 21, 2007", 15 pgs.
"European Application Serial No. 02803615.0, Office Action mailed Apr. 5, 2007", 7 pgs.
Byrne, D, "Paired Comparison Procedures in Hearing Aid Evaluations", *Ear & Hearing*, (1994), pp. 476-479.
Durant, E A., et al., "Hearing Aid Fitting with Genetic Algorithms", *Dissertation Presented at the International Hearing Aid Research Conference (IHCON)*, (2002), 1 pg.
Griffing, Terry S, et al., "Acoustical Efficiency of Canal ITE Aids", *Audecibel*, (Spring 1983), 30-31.
Griffing, Terry S, et al., "Custom canal and mini in-the-ear hearing aids", *Hearing Instruments*, vol. 34, No. 2, (Feb. 1983), 31-32.
Griffing, Terry S, et al., "How to evaluate, sell, fit and modify canal aids", *Hearing Instruments*, vol. 35, No. 2, (Feb. 1984), 3.
Mahon, William J, "Hearing Aids Get a Presidential Endorsement", *The Hearing Journal,*, (Oct. 1983), 7-8.
Oshaki, M, et al., "Improvement of Presenting Interface by Predicting the Evaluation Order to Reduce the Burden of Human Interactive EC Operators", *SMC Conference Proceedings. IEEE International Conference on Systems, Man, and Cybernetics*, (1998), pp. 1284-1289.
Sullivan, Roy F, "Custom canal and concha hearing instruments: A real ear comparison Part I", *Hearing Instruments*, vol. 40, No. 4, (Jul. 1989), 23-29.
Sullivan, Roy F, "Custom canal and concha hearing instruments: A real ear comparison Part II", *Hearing Instruments*, vol. 40, No. 7, (Jul. 1989), 30-36.
Takagi, H, et al., "Discrete Fitness Values for Improving the Human Interface in an Interactive GA", *Proceedings of the IEEE International Conference on Evolutionary Computation*, (1996), pp. 109-112.
Takagi, H, et al., "IEC-based Hearing Aid Fitting", *IEEE International Conference on Systems, Man, and Cybernetics*, (1999), pp. 657-662.
Takagi, H, "System Optimization Without Numerical Target", *Biennial Conference of the North American Fuzzy Information Processing Society (NAFIPS)*, (1996), pp. 351-354.
Watanabe, T, et al., "Recovering System of the Distorted Speech using Interactive Genetic Algorithms", *IEEE International Conference on Systems, Man, and Cybernetics, Intelligent Systems for the 21st Century.*, (1995), pp. 684-689.
"Canadian Application Serial No. 2,467,352, Office Action mailed Jul. 31, 2007", 3 pgs.
"European Application Serial No. 02803615.0, European Search Report mailed Aug. 17, 2007", 4 pgs.
"European Application Serial No. 02803615.0, Office Action mailed Aug. 22, 2007", 3 pgs.
"European Application Serial No. 02803615.0, Response filed Mar. 3, 2008 to Office Action mailed Aug. 22, 2007", 14 pgs.
"European Application Serial No. 02803615.0, Response filed Dec. 17, 2010 to Office Action mailed Aug. 9, 2010", 12 pgs.
U.S. Appl. No. 11/957,161, Advisory Action mailed Jun. 21, 2012, 3 pgs.
U.S. Appl. No. 11/957,161, Final Office Action mailed Apr. 9, 2012, 14 pgs.
U.S. Appl. No. 11/957,161, Non Final Office Action mailed Aug. 10, 2011, 14 pgs.
U.S. Appl. No. 11/957,161, Response filed Jan. 10, 2012 to Non Final Office Action mailed Aug. 10, 2011, 11 pgs.
U.S. Appl. No. 12/550,768 , Response filed Aug. 29, 2012 to Non Final Office Action mailed Mar. 29, 2012, 11 pgs.
U.S. Appl. No. 12/550,768, Non Final Office Action mailed Mar. 29, 2012, 20 pgs.
U.S. Appl. No. 12/550,768, Notice of Allowance mailed Sep. 17, 2012, 14 pgs.
Baskent, D, et al., "The Genetic Algorithms: A New Fitting Tool for Optimizing Hearing Aids' Advanced Features", [Online]. Retrieved from the Internet:<:http://www.starkeyresearch.com/our-research/publications.jsp, (2007), 1 pg.
Durant, Eric A, et al., "Efficient Perceptual Tuning of Hearing Aids With Genetic Algorithms", IEEE Transactions on Speech and Audio Processing, vol. 12, No. 2, (2004), 144-155.
Eiler, Cheryl, et al., "Genetic Algorithm: Are They the Future of Hearing Aid Fittings?", The Hearing Journal, 61 (12), (2008), 16-19.
Eisenberg, Laurie S, et al., "Subjective Judgments of Speech Clarity Measured by Paired Comparisons and Category Rating", Williams and Wilkins: Ear & Hearing, (1997), 294-306.
Furnkranz, Johannes, et al., "Pairwise Preference Learning and Ranking", Austrian Research Institute for Artificial Intelligence, (2003), 145-156.
Hullermeier, Eyke, et al., "Comparison of Ranking Procedures in Pairwise Preference Learning", Proceedings of the 10th International Conference on Information Processing and Management of Uncertainty in Knowledge-Based Systems, (2004), 8 pgs.
U.S. Appl. No. 11/957,161, Non Final Office Action mailed Aug. 30, 2013, 10 pgs.
U.S. Appl. No. 11/957,161, Notice of Allowance mailed Dec. 23, 2013, 6 pgs.
U.S. Appl. No. 11/957,161, Response filed Jun. 11, 2012 to Final Office Action mailed Apr. 9, 2012, 10 pgs.
U.S. Appl. No. 11/957,161, Response filed Dec. 2, 2013 to Non Final Office Action mailed Aug. 30, 2013, 10 pgs.

\* cited by examiner

| PARENT SET B | 3 | 1 | 6 | 3 |

| MUTATION SET | -1 | 0 | 3 | 0 |

| SUMMATION SET | 2 | 1 | 9 | 3 |

| CHILD SET B′ | 2 | 1 | 7 | 3 |

Fig.3C

HEARING AIDS AND METHODS AND APPARATUS FOR AUDIO FITTING THEREOF

CLAIM OF PRIORITY

The present application is a continuation of U.S. patent application Ser. No. 10/051,757, filed on Jan. 16, 2002, now U.S. Pat. No. 7,650,004, which is incorporated herein by reference in its entirety, which application is a continuation-in-part of U.S. patent application Ser. No. 10/001,229, filed on Nov. 15, 2001 now abandoned.

FIELD OF THE INVENTION

The present invention relates to hearing aids. In particular, it relates to methods and apparatus for efficaciously audio fitting them. More broadly, however, the present invention relates to perceptually tuning any system, such as hearing aids. Even more broadly, the present invention relates to genetic algorithms utilizing user input selection from paired comparisons for performing the tuning. Still even more broadly, the present invention relates to genetic algorithm crossover and mutation operators for use in a genetic algorithm that neither operates directly on a parametric value nor a string of bits representing the parametric value.

BACKGROUND OF THE INVENTION

Many fields encounter problems associated with perceptually tuning a system. For example, in perceptually tuning or "fitting" a hearing aid, antiquated methods subjected a single sensorineurally impaired user to many and various audio-related settings of their hearing aid and, often via technical support from an audiologist, individually determined the preferred settings for that single user. This approach, however, has proven itself lacking in universal applicability.

Thus, prescriptive fitting formulas have evolved whereby large numbers of users can become satisfactorily fit by adjusting the same hearing aid device. With the advent of programmable hearing aids, this approach has become especially more viable. This approach is, however, still too general because individual preferences are often ignored. There currently exists no accepted selection strategy that provides a structured and efficient approach to incorporating individual preferences into hearing aid fittings.

In one particular hearing aid fitting selection strategy, paired comparisons were used. In this strategy, users were presented with a choice between two actual hearing aids from a large set of hearing aids and asked to compare them in an iterative round robin, double elimination tournament or modified simplex procedure until one hearing aid "winner" having optimum frequency-gain characteristics was converged upon. These uses of paired comparisons, however, are extremely impractical in time and financial resources. Moreover, such strategy cannot easily find implementation in an unsupervised home setting by an actual hearing aid user.

In a more recent, and very limited selection strategy, genetic algorithms were blended with user input to achieve a hearing aid fitting. As is known, and as its name implies, genetic algorithms, first introduced by John H. Holland, are a class of algorithms modeled upon living organisms' ability to ensure their evolutionary success via natural selection. In natural selection, the fittest organisms survive while the weakest are killed off. The next generation of organisms (children) are, thus, offspring of the fittest previous generation (parents). The algorithms also provide for mutations as insurance against the development of a relatively unchanging population incapable of continued evolution.

In breeding children or offspring in a genetic algorithm, "crossover" operators are applied to parent genes. In essence, two parent bit strings (ones and zeroes, for example) from the algorithm are crossed at a crossover point and the children are given attributes of each parent. Mutation operators are also applied to a relatively smaller number of parent bit strings, typically by replacing ones with zeroes and vice versa. Both crossover and mutation closely model biological behavior where parent chromosomes line up and crossover thereby swapping portions of their genetic code or become mutated.

The determination of which children are the results of which parents, how many children are produced, how many children survive, how long parents survive, how many mutations per children are created and other similar algorithm manipulations are functions of each particular genetic algorithm and vary, probably, as widely as the number of genetic algorithms in use.

In this particular hearing aid selection strategy using genetic algorithms, human subjects were asked to rank 20 hearing selections on a scale of 1 to 5. Then, through a series of genetic algorithm computations, a winning hearing selection was converged upon.

With absolute scaling approaches of this type, however, humans are generally not able to maintain the same response criteria over such a wide number of listening trials. For example, what a subject might record as a 2 for the first selection might not be the same 2 recorded for the twentieth selection. In other words, the scaling makes the comparison selection too complex. Moreover, and as with all hearing aid fitting selection strategies, this approach is unrealistic for hearing aid users to implement in their home in an unsupervised setting.

In a broader setting, genetic algorithms have also seen application in other perceptual tuning environments. For example, they have been used to (interactively with human subjects) tune simulated automobile wind noise to the subject's satisfaction and to successfully fit head-related transfer functions. These activities, like hearing aid fittings, take place in research settings and cannot, even if it were desirable, be readily performed in unsupervised field settings.

In a still broader setting, some genetic algorithm operators (crossover and mutation), have typically ineffectively evolved an organisms' population because of quickness, slowness, unstableness or some other poorly performing process in the operators. This is because the operators themselves typically operate directly on bit strings or directly on parameters having a wide, varied and non-linear range.

Accordingly, the art needs a better and more simple selection strategy for fitting or tuning hearing aids to individual users' preferred settings. Preferably, it needs an unsupervised field setting implementation. In a broader setting, the art needs better genetic algorithms for perceptually tuning a system having many interacting parameters. Still even more broadly, the art needs better genetic algorithm operators that serve to better evolve populations.

SUMMARY OF THE INVENTION

The above-mentioned and other problems become solved by applying the apparatus, method and system principles and teachings associated with the hereinafter described hearing aids and audio fitting thereof. Even further, by applying the principles and teachings described for genetic algorithm operators, better genetic algorithms can be applied to perceptually tuning any system, such as a radio, a hearing aid, a personal data or digital assistant device, etc.

In one embodiment, a field ready, unsupervised-use ready, method and apparatus for fitting a hearing aid is described in a hand held configuration having paired comparisons (hearing selections) stored in and derivable from a memory therein. The paired comparisons are presented one at a time to a user and a preferred selection for each paired comparison is made by a select indicator after the user toggles back and forth between the selections for as many times necessary in determining his or her preferences. A genetic algorithm converges all the preferences upon a single solution. Crossover and mutation genetic algorithm operators operate on a linear range of indexes representative of parametric values of the pairs. A fully integrated hearing aid having all the above described features incorporated therein is also presented.

In still another embodiment, a genetic algorithm for perceptually tuning a system is presented that converges upon a solution set from a plurality of parent and child sets in first and second populations that were presented to a user in a paired comparison format.

In still other embodiments, crossover and mutation genetic algorithm operators are described that neither operate directly on a parametric value nor a string of bits representing the parametric value, but on a linear range of indexes representative of parametric values used by a parent from a population.

These and other embodiments, aspects, advantages, and features of the present invention will be set forth in part in the description that follows, and in part will become apparent to those skilled in the art by reference to the following description of the invention and referenced drawings or by practice of the invention. The aspects, advantages, and features of the invention are realized and attained by means of the instrumentation, procedures, and combinations particularly pointed out in the appended claims.

BRIEF DESCRIPTION OF THE DRAWINGS

FIG. 3C is a diagrammatic view in accordance with the teachings of the present invention showing a genetic algorithm mutation operator;

DETAILED DESCRIPTION OF THE PREFERRED EMBODIMENTS

In the following detailed description of the preferred embodiments, reference is made to the accompanying drawings which form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process, electrical or mechanical changes may be made without departing from the scope of the present invention.

Figure 1A:
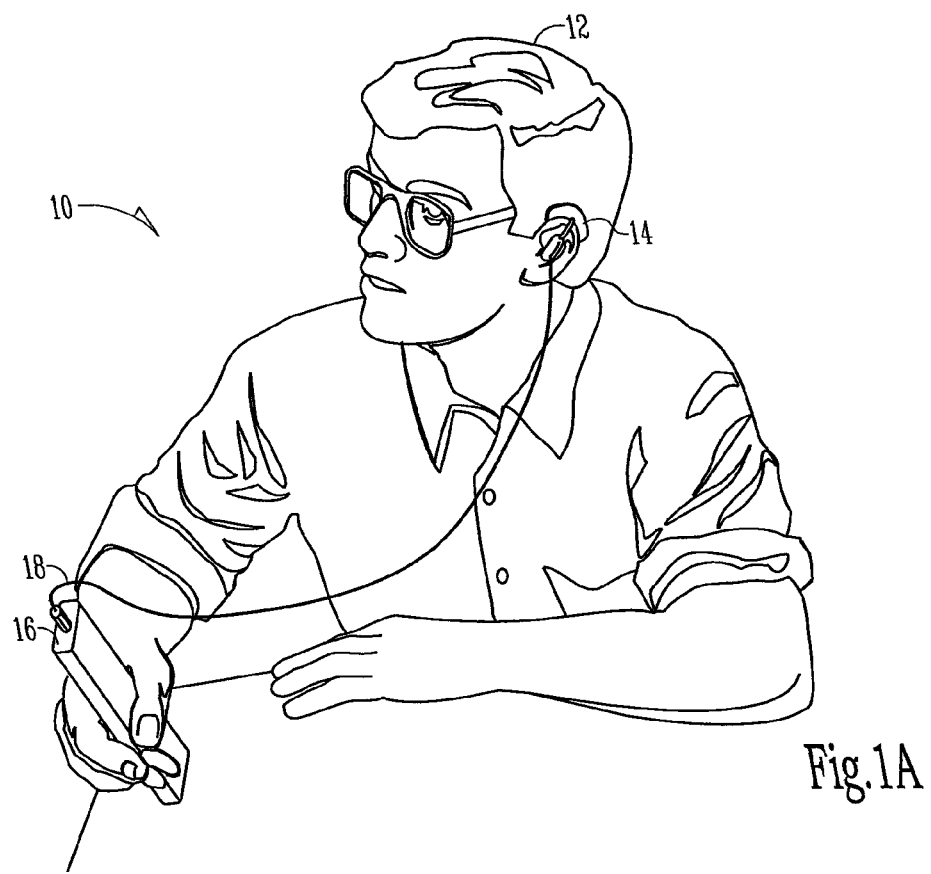
FIG. 1A is a diagrammatic view of a perceptual tuning system in accordance with the teachings of the present invention showing a hearing aid user and apparatus useful in an audio fitting thereof.

With reference to FIG. 1A, a perceptual tuning system of the present invention is shown generally as 10. The system, as presented in this figure and the remaining description, is in the context of fitting a hearing aid for a sensorineurally impaired user. It will be appreciated, however, that the system may and should be extended to various other environments, such as tuning a radio, a personal data assistant or any of a number of devices requiring such tuning. Thus, the present invention is not expressly limited to a hearing aid fitting unless so defined in the claims.

Figure 1B:
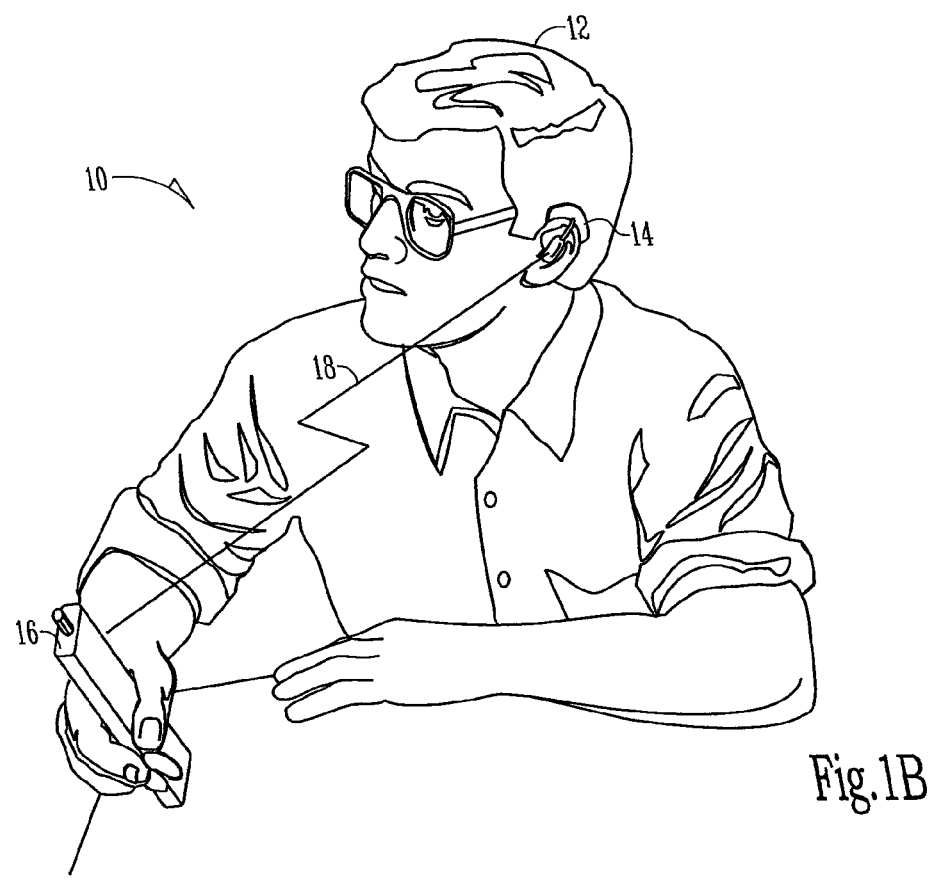
FIG. 1B is a diagrammatic view of a perceptual tuning system in accordance with the teachings of the present invention showing a hearing aid user and apparatus useful in an audio fitting thereof in a wireless embodiment.

As illustrated, the system 10 has a user 12 outfitted with a hearing aid 14, an apparatus 16 in a hand held configuration for audio fitting the hearing aid via user selection of paired comparisons stored in and derivable therefrom and a communications link 18 in between. In one embodiment, as depicted by FIG. 1B the communications link 18 is a wireless link and the necessary communications hardware are found in apparatus 16 and hearing aid 14 to support the wireless link. Apparatus 16 is a self-contained device ready for field use (e.g., home use) in an unsupervised setting.

It will be further appreciated that the system of FIG. 1A (or FIG. 1B) is shown as a left hearing aid configuration and one skilled in the art will be readily able to adapt the teachings herein and apply them without undue experimentation to right hearing aid embodiments and to systems having both left and right hearing aid embodiments. As such, the claims of the present invention are not to be construed as limited to a single, left hearing aid configuration.

It will be even further appreciated that hearing aids, although always having analog components, such as microphones and receivers, are generally referred to according to their primary mode of signal processing (analog processing or digital signal processing (DSP)) and can be of any type as described herein. The claims, therefore, are not to be construed as requiring a specific type of hearing aid.

Still further, although not shown, the present invention may find applicability in contexts in which an audiologist uses apparatus 16 to assist user 12 in fitting hearing aid 14.

Figure 2:
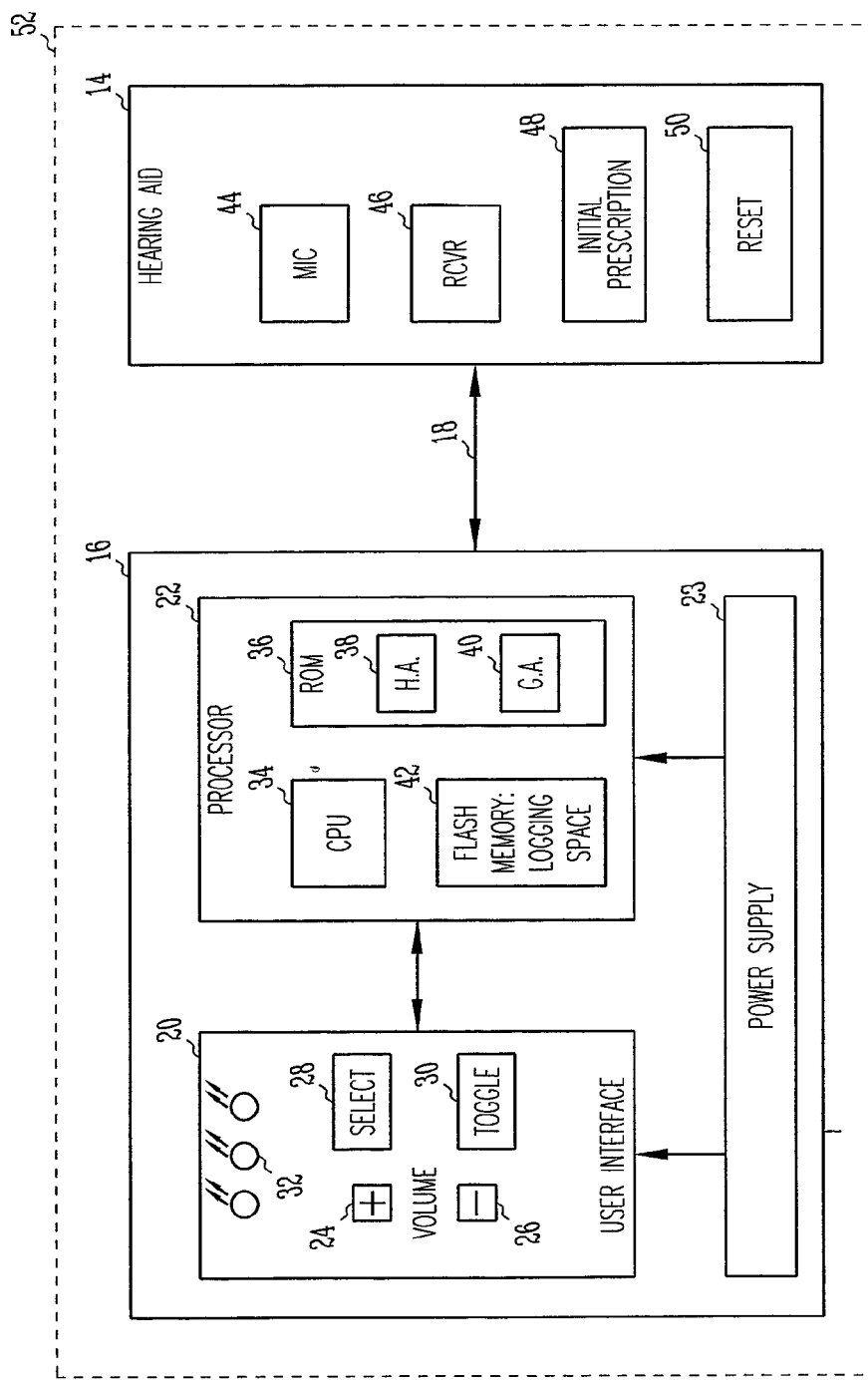
FIG. 2 is a block diagram in accordance with the teachings of the present invention for the system of FIG. 1 (FIG. 1A or FIG. 1B)

With reference to FIG. 2, the apparatus 16 and hearing aid 14 of system 10 are representatively shown in block diagram format and will be described first in terms of their electromechanical interconnections. Thereafter, and with simultaneous reference to other figures, the apparatus and heating aid of system 10 will be described in functional detail. In the embodiment shown, apparatus 16 includes fully integrated user interface 20, processor 22 and power supply 23 for providing necessary voltage and currents to the user interface and processor. In an alternative embodiment, the apparatus 16 is separated into discrete components and/or discrete/integrated hybrids connected by appropriate communications links between the functional blocks with common or discrete internal or external power supplies.

User interface 20 may include volume switches 24, 26, respectively, for increasing (+) or decreasing (−) a volume of the apparatus 16 as appropriate. Select indicator 28 is used to indicate user preference between paired comparisons. Toggle device 30 allows the user to toggle back and forth between paired comparisons as often times as necessary before indicating their preference. The actual presentment of paired comparisons and indication of preference will be described in much more detail below.

The volume switches 24, 26, the select indicator 28 and toggle device 30 may be any of a variety of well known integrated or discrete switches, slides, buttons, etc. They preferably include electro-mechanical switches that send electrical signals in response to a mechanical manipulation thereof. They preferably have appropriate size and shape to enable users to comfortably and intuitively manipulate them with very little manual dexterity.

In another embodiment, the toggle device 30 is not a mechanical device to be manipulated by a user but a software algorithm stored in processor memory that automatically toggles between paired comparisons according to a preferred timing schedule.

Visual indicators 32 of varying number, color and pattern are also preferably provided in the form of lights, such as light-emitting diodes (LED) to provide immediate visual feedback to the user upon manipulation of one of the user inputs.

Connected to the user interface 20 is processor 22 having a central processing unit 34, preferably a DSP with internal on-chip memory, read-only memory (ROM) 36 and flash memory 42 for use as a logging space of the user inputs from user interface 20.

ROM 36 preferably includes at least two algorithms. Hearing aid algorithms 38 and genetic algorithms 40.

In a fashion similar to that of the apparatus itself, it should be appreciated that processor 22 may be a fully integrated device or comprised of discrete components or a discrete/integrated hybrid and that all such embodiments are embraced herein.

The foregoing apparatus 16 is connected at one end of the communications link 18. At the other end is the hearing aid 14. In one embodiment, the communications link 18 is a set of wire(s). In an alternate embodiment, the link 18 is wireless. The link 18 in such embodiments includes, but is not limited to, any well known or hereinafter developed communications scheme, modulated or un-modulated technologies, including, but not limited to, wireless radio frequencies, infrared transmitter/receiver pairs, Bluetooth technologies, etc. In such embodiments, suitable hardware/software processing devices would be contained in the apparatus 16 and the hearing aid 14.

As shown, the hearing aid 14 contains an initial prescription setting 48, a microphone 44, a receiver 46 and a reset mechanism 50. It will be appreciated the hearing aid also contains other mechanisms that are not shown but are well known to those skilled in the art, such as a power supply and a signal processor.

In one embodiment the apparatus 16 and hearing aid 14 are discrete components. In another embodiment, the entire contents of apparatus 16 and hearing aid 14 are fully integrated into one single hearing aid package 52.

Before describing the functional operation of the apparatus 16 together with hearing aid 14, or, alternatively, completely integrated hearing aid package 52, some words and nomenclature as used throughout this specification are presented. A "parameter" as used herein relates to a characteristic element of the system 10 that can take on a discrete value. In some embodiments, the discrete value is selected from one of a range of values. In one embodiment, for example, a parameter of Filter Length, L, (in # of filter taps) the discrete parametric value is 9. It is understood that the parameter L is not limited to a particular value of 9 and can be another number. The parameter L is capable of being any of the discrete values, including, but not limited to, 1, 2, 3, 4, 5, 6, 7, 8, 9, 10, 13, 16, 20, 25, 32, 40, etc. In one embodiment, the filter length L may be as short as 1 (mere scaling of the input) and as long 256. The parameter L may be a discrete value taken from a range of countable numbers, for example, {3, 4, 5, 6, . . . , N or Infinity}. The parameter L may also be a discrete value taken from an irregular set, such as {8, 10, 13, . . . , 32, 40}, for example. Other range types and ranges are possible, and the examples given here are not intended in a limited or exclusive sense. Typically what constrains the upper limit is the size of available memory, processing speed and the ability of a user to discern differences in that many filter taps. Some particular examples of parameters for perceptually tuning a hearing aid may be, but are not limited to, any of the following terms well known to research audiologists and audio processing engineers skilled in the art: gain, compression ratio, expansion ratio, frequency values, such as sampling and crossover frequencies, time constant, filter length, compression threshold, noise reduction, feedback cancellation, output limiting threshold, compression channel crossover frequencies, directional filter coefficients, constrained representations of large parameter groupings, and other known or hereinafter considered parameters. A "set" as used herein is one or more parameters. A "population" is a plurality of sets. Capital letters A, B, C, D, . . . X, . . . etc., having subscripts or superscripts or both therewith will either be a particular parameter, such as $A_1$ or $A'_1$, or a particular set, such as set A, set A', set B, set C, . . . set X, . . . etc. and will be understood from the context in which they are used. Numerous sets and sets of sets will be hereinafter presented. For clarity, they will often be presented in combination with reference to any of a variety of terms such as "parent," "child," "mutation," or "summation." These particular types of sets will also be understood from the following discussion.

Figure 3A:
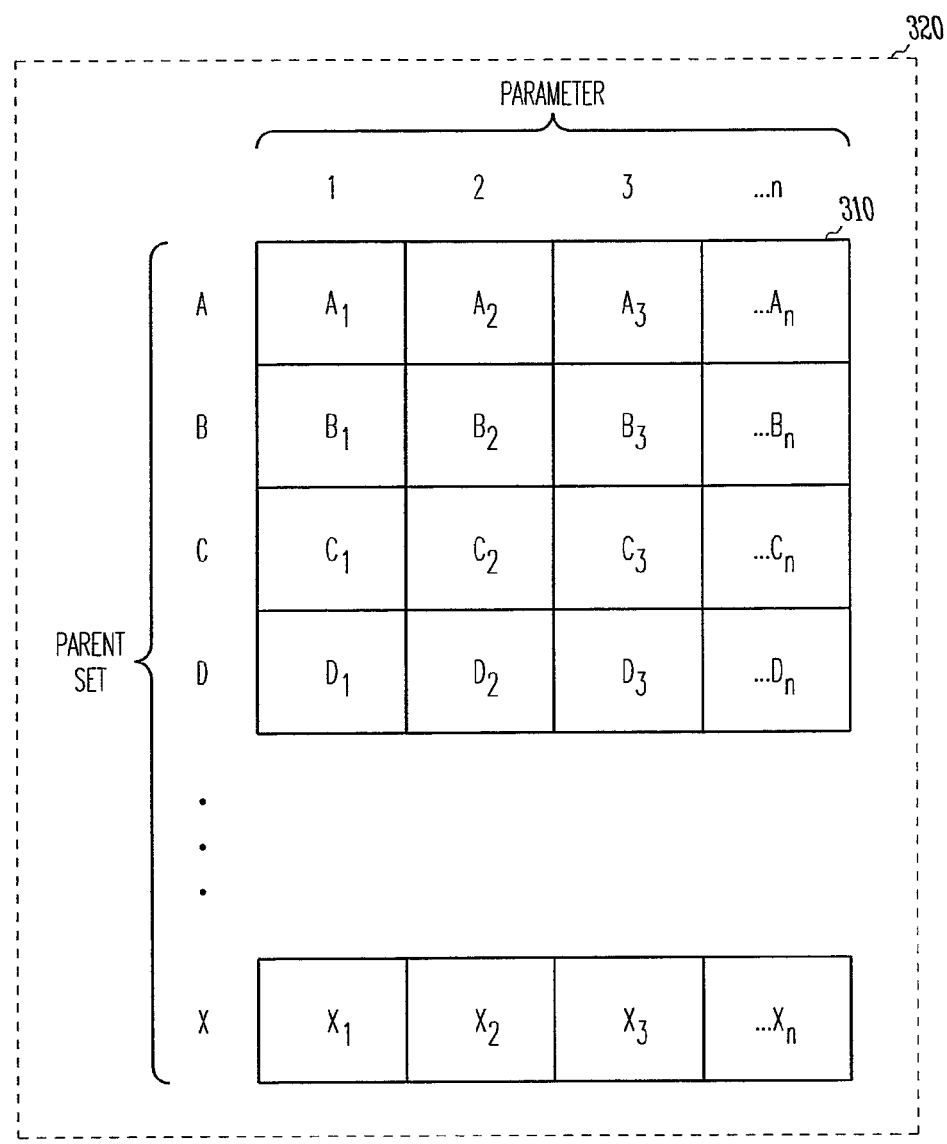
FIG. 3A is a diagrammatic view in accordance with the teachings of the present invention showing a first population comprised of a plurality of parent sets.

With reference to FIG. 3A, a population 320 is shown in tabular presentation 310 as a plurality of sets, set A, set B, set C, set D, . . . set X. Each set has, as defined, one or more parameters 1, 2, 3, . . . n (i.e., n≥1) wherein, for example, parameter 1 for set A is shown as $A_1$ while parameter 3 for set C is shown as $C_3$ etc. It will be appreciated that the depiction of a population in the foregoing manner is merely illustrative to enhance the reader's understanding of the present invention and does not require a physical creation of the population, nor is it required to be created in any particular format or groupings. As defined, it needs to be a plurality of sets.

Figure 4A:
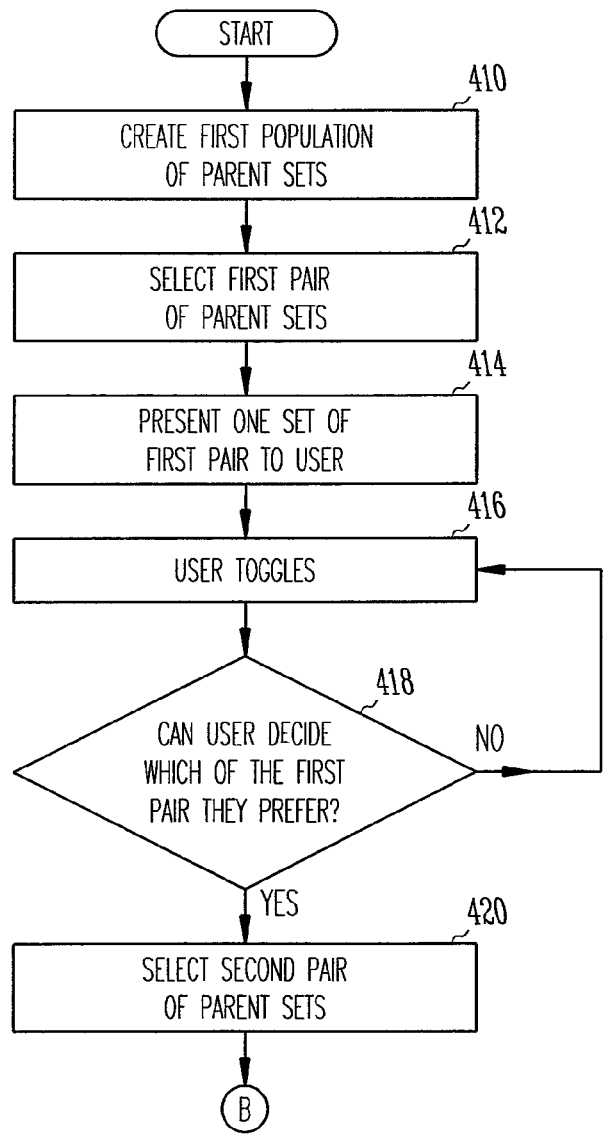
FIG. 4A is a first portion of a flow diagram in accordance with the teachings of the present invention showing paired comparisons presented to a user for selection thereof.
Figure 4B:
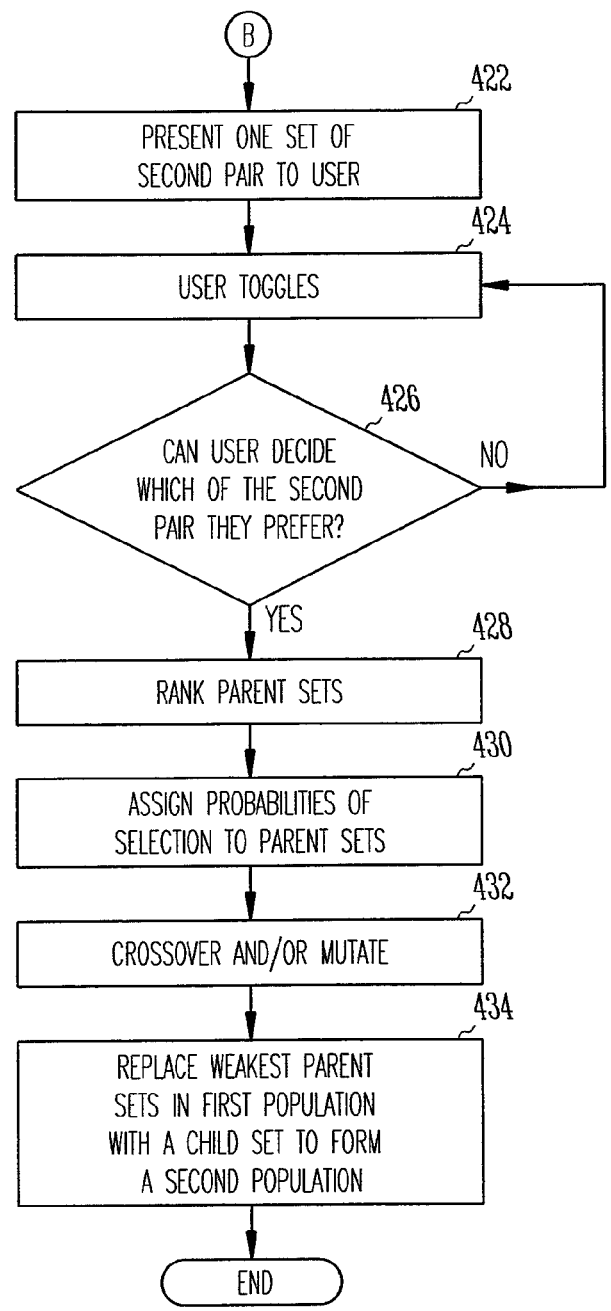
FIG. 4B is a second portion of a flow diagram in accordance with the teachings of the present invention showing paired comparisons presented to a user for selection thereof.

With simultaneous reference to the many figures, a preferred embodiment of the present invention will be described that illustrates the methods for utilizing user selection between paired comparisons, and the genetic algorithms used to process the selections, in fitting hearing aids. At step 410 of FIG. 4A, a population 320 is created. For clarity, since multiple populations are set forth hereinafter, this population will be a first population. The sets A, B, C, D, . . . X shown in population 320 will be referred to as parent sets. This first population is stored in any of the memories of the processor 22.

At step 412 a first pair of parent sets from the population 320 is selected for presentation to the user 12. This first pair can be any two sets of the parent sets of the first population and are preferably (but not necessarily) selected via the genetic algorithm to be described below. For example, the first pair consists of parent set A and parent set B. This step is invisible to the user and is performed very rapidly in processor 22.

At step 414, the first pair of parent sets is presented to the user. Presentation of the first pair of parent sets, it should be appreciated, means presentation of one parent set at a time, either parent set A or parent set B, for example. Presentation in the perceptual tuning environment of a hearing aid is accomplished via hearing aid 14. It will be further appreciated that since the parent sets of population 320 are comprised of one or more parameters, and since hearing aids have many parameters used to process sound, the user while being presented a pair of parent sets is actually being presented with a set of parameters through which they "hear" sounds. The user does not actually hear the parameters, they merely hear sounds in their hearing aid as processed via the parameter sets in parent set A or parent set B. Usually, hearing aids have appropriate and proprietary software to process sounds, such as hearing aid (H.A.) algorithm 38 stored in ROM 36 of apparatus 16.

In one actual experiment performed by the inventor of the present invention, parent sets were presented to a user in order to cancel feedback in the hearing aid. The sets were comprised of three parameters and two of the parameters were selected from the list consisting of Filter length, L, and time constant, α. Each of these parameters are summarized in the following table, Table 1.

TABLE 1

Exemplary Parametric Values Used in Experimental Testing

| | L, Filter Length (# of filter taps) | | | | | | |
|---|---|---|---|---|---|---|---|
| | 8 | 10 | 13 | 16 | 20 | 25 | 32 | 40 |
| α, Time Constant ($\times 10^6$) (1/sec) | 10 | 14 | 19 | 27 | 37 | 52 | 72 | 100 |

It should be appreciated that parameter Filter Length, L, for example, is one of any 8 discrete values (8, 10, 13, 16, 20, 25, 32, 40) arrived at via experimental data and is not to be considered limiting of the scope of the present invention.

Eventually, the user will need to determine which parent set they like better. Since a user can only "hear" one parent set at a time, either parent set A or B, for example, the user will need to toggle, at step 416, to the other parent set. Toggling is accomplished via depressing of toggle device 30.

To assist the user in determining which parent set they like better, they should perform a variety of tasks pertinent to the tuning. In the actual experiment, users were asked to "listen" to the parent sets in a variety of environments prone to feedback, such as placing their hand over their ear(s), listening to telephone dial tones, performing jaw movements, listening in the presence and/or absence of other background noises, and other similar activities.

At step 418, after performing such tasks, can the user decide which parent set of the first pair they prefer? If they cannot, they merely repeat steps 416 and 418 for as many times necessary until they can indicate a preference. If they can, the user indicates a preference by depressing select indicator 28 whereupon the result is logged-in the logging space of flash memory 42. The logging space, for example, can be arranged in many ways. In a preferred embodiment, it can be arranged to record that parent set B was preferred over parent set A, such that an A or a B are recorded in a memory address pointing to the parameters from the parent sets that are actually part of parent sets A and B. Whether this type of logging is performed or another, they are to be embraced by this invention. All types of memory recording are well known write techniques.

At step 420, a second pair of parent sets from the first population is selected for presentment to the user. In continuing the example, parent set C and parent set D are selected via the genetic algorithm 40 stored in ROM 36.

One at a time, one of parent sets C or D is presented to the user at step 422 and the user toggles to the other of the parent sets at step 424. If the user cannot decide which of the parent sets of the second pair they prefer (step 426), they toggle back and forth between the second pair of parent sets.

Thereafter, the parent sets are ranked at step 428. A hierarchical ranking is determined for each parent set included in the presentation to the user. For example, parent sets A, B, C and D were presented to the user as first pair parent set A and B and second pair parent set C and D.

If the user preferred parent set B over A and parent set D over C, the ranking would be as follows: parent set B≻ parent set A; and parent set D≻ parent set C with the relationships between, at least the two preferred parent sets {B, D} and the two non-preferred parent sets {A, C} being unknown. As such, it is likely that more than two iterations of presentment of pairs to the user would be performed. How many iterations depends upon how large the population is and what inferences can be made therefrom as will be shown in the continuing example. It should be appreciated that such description regarding how many pairs are presented is part of the work of the genetic algorithm 40 preferably stored in ROM 36 of apparatus 16. As such, no exact number of paired comparisons is required.

Intuitively, with fewer than four parent sets, fewer iterations are necessary. For example, if the population only consisted of two parent sets, only one pair of paired comparison need be presented before it is understood which parent set is preferred over all other sets and which set is preferred least amongst all other sets.

To continue, if parent set B and parent set D were presented to the user for paired comparison and the user indicated a preference for parent set B over D, we would also have: parent set B≻ parent set D.

Or, graphically:

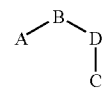

At this point, although parent set B and parent set C were never presented in direct comparison to one another, it can be inferred that parent set B≻ parent set C. If you next presented parent set A and parent set D, and parent set D is indicated as preferred over parent set A, the genetic algorithm knows, and can more meaningfully receive a ranking (step 428): parent set B≻ parent set D≻ {A, C} where the relationship between parent set A and C is unknown. In a preferred embodiment, the ranks given are parent set B equal to number 1, parent set D equal to two, and parent sets A and C equal to 3.5 or ((3+4)/2) since they "tied." The advantage of the foregoing is that inconsistencies are avoided by not making comparisons when the dominance-equivalence relationship can be inferred from previous responses (parent set B "dominates" C, parent set A is "equivalent" to C, for example).

With genetic algorithms, as in biology, the least fit genes do not survive. As such, the relationship between parent sets A and C is unnecessary to determine.

After ranking, probabilities of selection (as preferences are indicated via the select indicator 30) are assigned to the ranked parent sets at step 430.

In this example, the probabilities are presented in Table 2.

TABLE 2

Exemplary Probabilities of Selection of Parent Sets

| Parent Set ($_i$) | Probability of Selection, $p_i$ |
| --- | --- |
| A | 0.19 |
| B | 0.36 |
| C | 0.19 |
| D | 0.26 |

As will be noticed, the probabilities add up to equal one with higher probabilities assigned to those parent sets with higher ranks, i.e., those parent sets more likely to be selected by the user in a paired comparison over another parent set. Accordingly, parent set B has the highest probability while parent sets A and C have the lowest.

At step 434, the weakest, or least fit, parent sets of the first population will be replaced with child sets. In arriving at the child sets, it must first be determined which of the parent sets are the fittest so that the fittest survive while the weakest die. From the table, parent sets B and D are the fittest simply because they have the highest probabilities of selection while parent sets A and C are the weakest.

Once the two fittest parent sets are determined, genetic algorithm operators, either crossover and/or mutation at step 432 are applied to at least one parent set to produce child set(s). In one embodiment, the two fittest parent sets could be selected to produce child sets. In another embodiment to determine which parent sets will be used to produce a child set, two unique fittest sets of the parent sets are selected. This is done by associating each of the parent sets with intervals of numbers and, depending upon the comparison of intervals with the output of a random number generator between zero and one (such as that provided by a uniform random number generator), selecting the two unique fittest parent sets.

For example, parent set A is associated with the interval of numbers [0, $p_A$] or from Table 2, [0, 0.19], parent set B the interval ($p_A$, $p_A+p_B$] or (0.19, 0.55], parent set C the interval ($p_A+p_B$, $p_A+p_B+p_C$] or (0.55, 0.74], and parent set D ($p_A+p_B+p_C$, $p_A+p_B+p_C+p_D$] or (0.74, 1.0]. Next, in the actual experiment, a random number generated two outputs. A 0.95 followed by a 0.23. Thus, the two unique fittest parent sets are parent sets D and B (i.e, 0.95 is found in the range of the interval for parent set D (0.74, 1.0] while 0.23 is found in the range of the interval for parent set B (0.19, 0.55]). Thus, parent sets B and D are the two unique fittest sets and will be used to produce child sets.

To illustrate both crossover and mutation, a table of indexes will be created from the exemplary parametric values from Table 1. In devising this table of indexes, however, only the filter length parameter will be used. It will be appreciated, though, that index tables for all parameters could be constructed. In this instance, parameter filter length, L, has 8 values (8, 10, 13, 16, 20, 25, 32 and 40) from Table 1. This parameter range reflects a wide range of values and it should be appreciated that it is non-linear. Then, an index is assigned for each value. Sine there are eight values, eight indexes or indexes are assigned. In this case, indexes in a parent index range from 0-7 were selected with 0 being the low parent index and 7 being the high parent index. The result is shown in Table 3.

TABLE 3

Exemplary Table of Indexes for Filter Length, L, from Table 1.

| | Index | | | | | | | |
| --- | --- | --- | --- | --- | --- | --- | --- | --- |
| | 0 (Low) | 1 | 2 | 3 | 4 | 5 | 6 | 7 (High) |
| L, Filter Length | 8 | 10 | 13 | 16 | 20 | 25 | 32 | 40 |

Figure 3B:
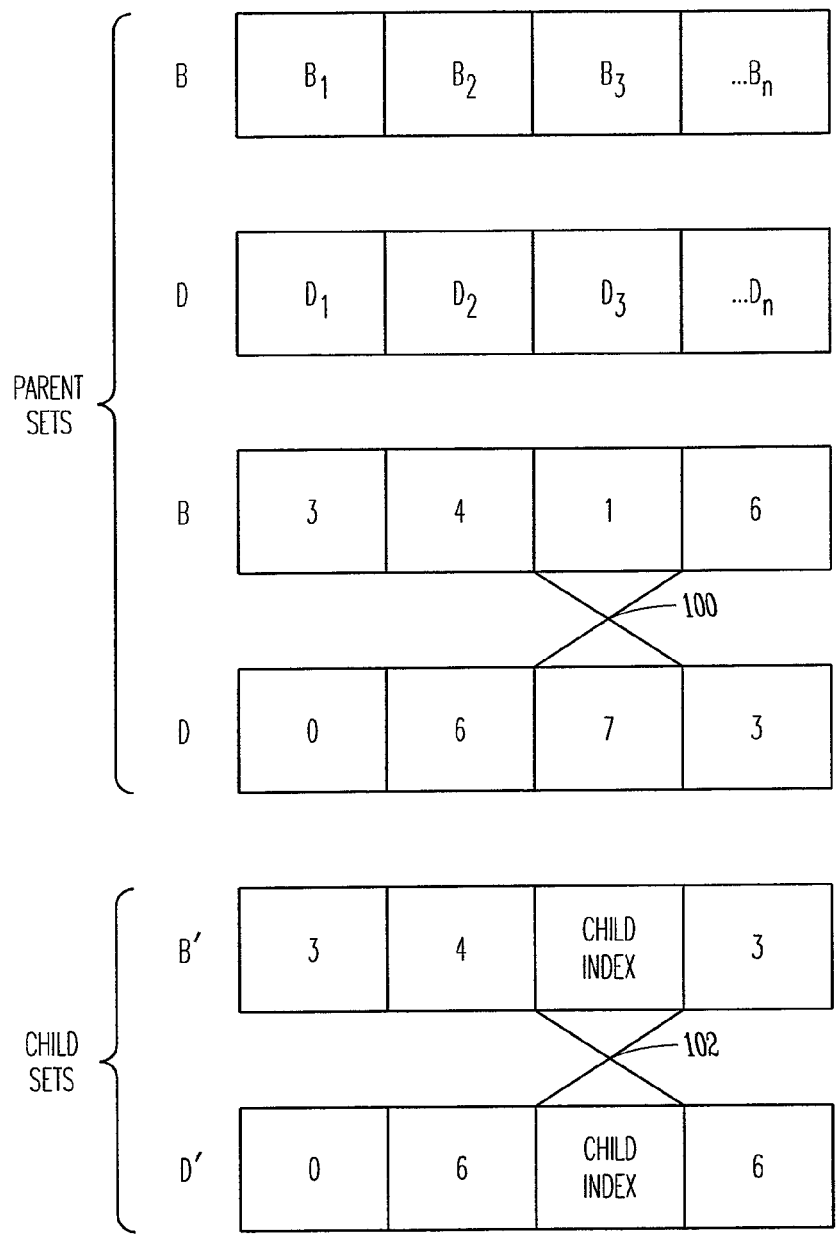
FIG. 3B is a diagrammatic view in accordance with the teachings of the present invention showing a genetic algorithm crossover operator.

Then, with reference to FIG. 3B, the genetic algorithm crossover operator will be described as acting on the two fittest parent sets from the previous example (parent set B and D which are also the two unique fittest sets). In the figure, parent set B is comprised of a plurality of parameters 1 through n as shown by $B_1$ through $B_n$. In this example, n will equal 4. Likewise, for parent set D.

Parameter 1 for parent set B is a filter length of 16. Parameter 2 for parent set B is a filter length of 20. Parameter 3 for parent set B is a filter length of 10. Parameter 4 for parent set B is 32. Instead of showing parent set B as a set of parameter values, it is shown as a set of indexes. Thus, parent set B is shown as:

| 3 | 4 | 1 | 6 |
| --- | --- | --- | --- | where 3, 4, 1, and 6 are the parent indexes corresponding to the respective filter lengths 16, 20, 10, and 32. In a similar fashion, parent set D has parent indexes of 0, 6, 7, and 3.

In a first step for performing crossover, select a parent index position 100 and a child index position 102. In this embodiment, both positions are the same and correspond to the third index position (from the left) in both parent sets B and D (i.e., index 1 for parent set B and index 7 for parent set D) and the child index position 102 in both child sets B' and D'.

Then, create indexes in the child set B' by:
  i) reproducing in child set B', to a left of the child index position, the parent indexes of one of the parent sets (parent set B) to the left of the parent index position (in this case indexes 3 and 4);
  ii) reproducing in child set B' to a right of the child index position, the parent indexes of the other of the parent sets (parent set D) to the right of the parent index position (in this case index 3); and
  iii) at the child index position, create any child index that is substantially equal to the low parent index (0), the high parent index (7) or any index in the range of indexes from the low parent index (0, from Table 3) to the high parent index (7, from Table 3). Likewise for child set D'.

In another embodiment, step iii) comprises, at the child index position, selecting the indexes from parent sets B and D (index 1 and index 7, respectively) and using a random number to select two new child indexes (one for each child set) in the range of between index 1 (low parent index) and index 7 (high parent index) that sum to the same value as the sum of the two parent set indexes, in this case, 1+7=8. For example, the two new child indexes for child sets B' and D' respectively, which all sum to the value 8, include (1,7), (2,6), (3,5) (4,4), (5,3), (6,2) and (7,1).

For mutation, with reference to FIG. 3C, begin with a parent set (parent set B). Again, the parent set is comprised of parameters being represented by parent indexes 3, 1, 6, and 3. Next, create a mutation set having a plurality of mutation indexes. In this example, they include −1, 0, 3, and 0.

Sum the mutation indexes and the parent indexes of the mutation and parent sets to form a summation set having a plurality of summation indexes. In this example, 2, 1, 9, 3 or (3+−1), (1+0), (6+3), (3+0).

Finally, reproduce the summation indexes in a child set. Since the summation indexes in this example had one index, the number 9, outside the range of the parent indexes from low parent index 0 to high parent index 7, the index 9 was rounded to the closest parent index in the range. In this example, the index 9 was rounded to 7 and the child set B' became child indexes 2, 1, 7, and 3.

Figure 3D:
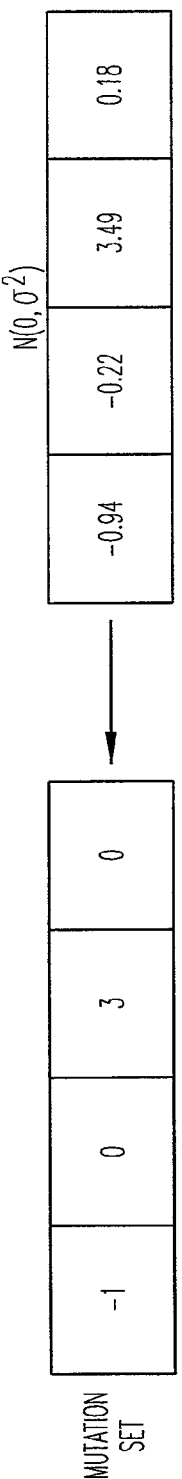
FIG. 3D is a diagrammatic view in accordance with the teachings of the present invention showing a creation of a mutation set for the mutation operator of FIG. 3C.

In determining the mutation set, it is preferred to use a random number generator to come up with the mutation indexes. With reference to FIG. 3D, it will be appreciated that the mutation indexes −1, 0, 3, and 0 were obtained by respectively rounding random numbers −0.94, 0.22, 3.49, and 0.18 to the nearest positive or negative integer.

In a preferred embodiment, the random numbers −0.94, 0.22, 3.49, and 0.18 were obtained from a normal distribution, $N(0, \sigma^2)$ for random variables having an average of 0 and a variance of distribution being equal to $\sigma^2$ where $\sigma$=(a system constant×the number of indexes in the range of parent indexes). In this example, the system constant is 0.2 which was determined empirically by various run simulations of numbers while the number of indexes in the range of parent indexes 0-7 is eight (8): $\sigma=0.2\times 8=1.6$.

Mutation indexes could also be arrived at by various other random numbering schemes well known in the art. They could even be obtained without regard to random numbering. It is believed, however, that random numbers make the system more robust.

It should be appreciated that in the foregoing, the table of indexes is linear while the parametric values represented by the table of indexes is non-linear. In this manner, it has been observed that better evolution of populations occurs as compared to other evolution schemes that crossover and mutate directly on bit strings or directly on parameters having a wide, varied and non-linear range. Unlike those schemes where evolution is often too quick, too slow, too unstable or some other poorly performing process, the evolution of the present invention is stable and robust.

It should also be appreciated that use of the foregoing described operations for performing crossover and mutation, ultimately, allows mixing and matching of different parameter sets having different units and measuring schemes.

Figure 3E:
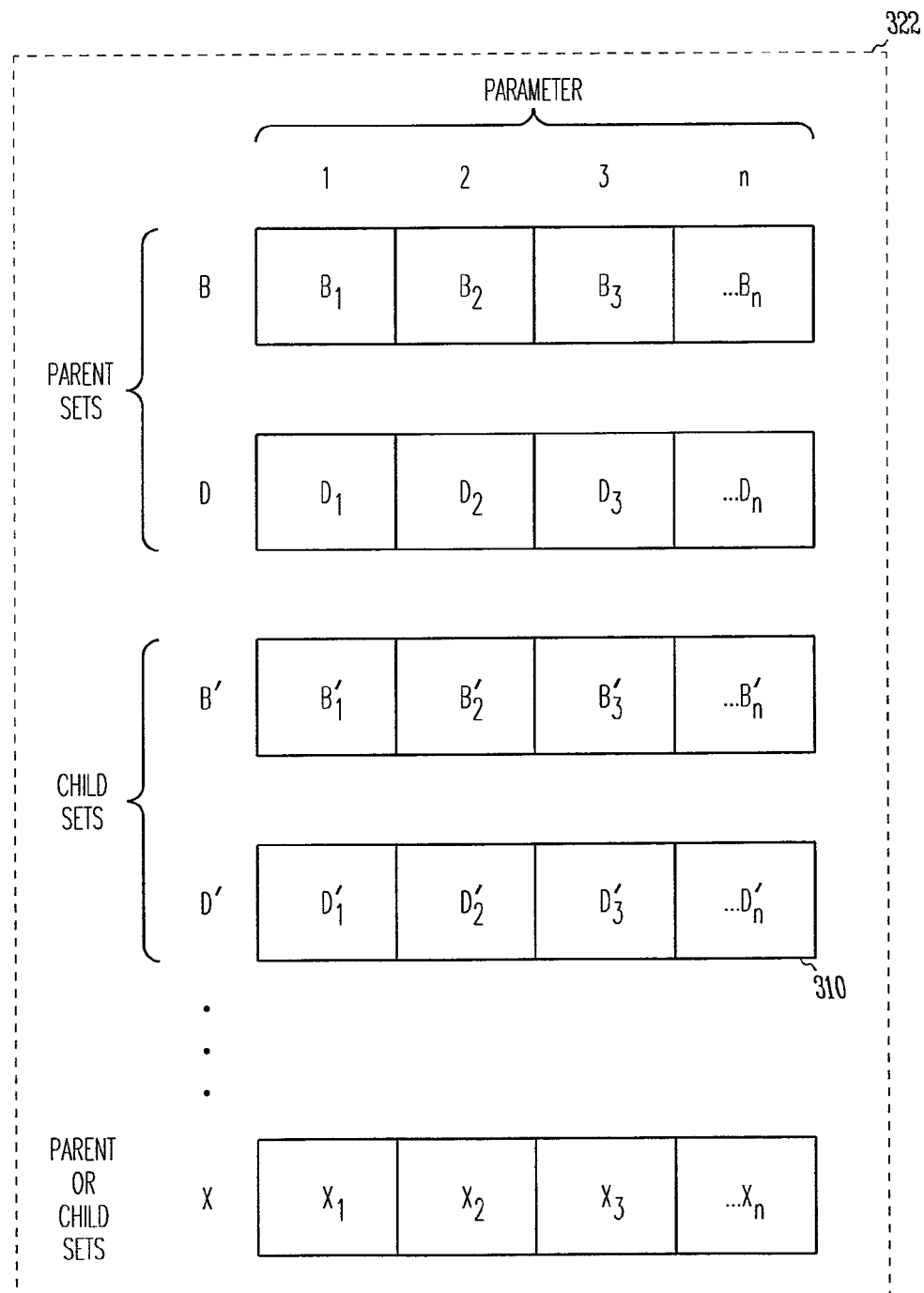
FIG. 3E is a diagrammatic view in accordance with the teachings of the present invention showing a second population comprised of a plurality of parent and child sets.

Thereafter, at step 434, the least fit or the weakest parent sets of the first population are replaced with child sets obtained from mutation, crossover or both. For example, in FIG. 3E a second population 322 results, presented in tabular form 310, having weak parent sets A and C of the first population replaced with child sets B' and D' from the crossover operation of FIG. 3B.

Thereafter, the steps beginning at step 410 of presenting paired comparisons to users begin again. It should be appreciated, however, that when comparisons are made now, they are made from the sets of the second population. As such, parent sets may be compared exclusively to other parent sets, child sets compared exclusively to other child sets, or a hybrid comparing child sets to parent sets.

As this process repeats itself, numerous population sets may be evolved that are many generations removed from the first population. The present invention is not limited to any particular number of population generations.

It should be further appreciated that as generations evolve (more populations are created), the relationships in the previous population are already known so that the only relationships that need to be determined are those between the child sets and the child sets with parent sets. As such, fewer comparisons are required with each next population. This results in less time being required for each next population.

How often mutation and crossover occur in relation to one another is a function of user preference. In one embodiment, more crossovers happen early on with more mutations happening later or vice versa. In another embodiment, crossovers and mutations occur together in the same exact number. In still another embodiment, crossovers exceed mutations, or vice versa.

The process described above repeats itself for as many times as necessary to arrive at a converged upon solution set having the preferred set of parameters for fitting the hearing aid to the particular user. For example, it may be discovered that child set B' is the preferred set of all sets presented.

Consequently, it should be appreciated that users do not have to maintain consistent application of numbering scales, such as from 1 to 5, in their minds as they apply them to numerous various hearing solutions. They simply need to indicate a preference for one element of each pair (of hearing aid settings). This is as simple as depressing a select indicator on a hand held device after toggling back and forth between the selections for as many times necessary in determining their preferences. A genetic algorithm does all the computation and kills off poor (weak) hearing solutions thereby quickly converging all the preferences upon a single solution. In the actual experiment, users made approximately 50 to 75 paired comparisons during about one hour of listening.

Moreover, the present embodiments now advantageously provide a solution whereby field ready (in home), unsupervised use ready hearing aids can be fit without need of any input other than the user's.

In another embodiment, the initial prescription setting 48 can be reset via mechanism 50 to update or replace the original prescription with the parameter(s) of the converged upon solution set. In this manner, the hearing aid prescription can be modified according to individual preferences in the user's home environment. Preferably, reset mechanism 50 is a read/write device that can read the parameters of the solution set and write them over the parameters of the initial prescription setting.

Figure 5:
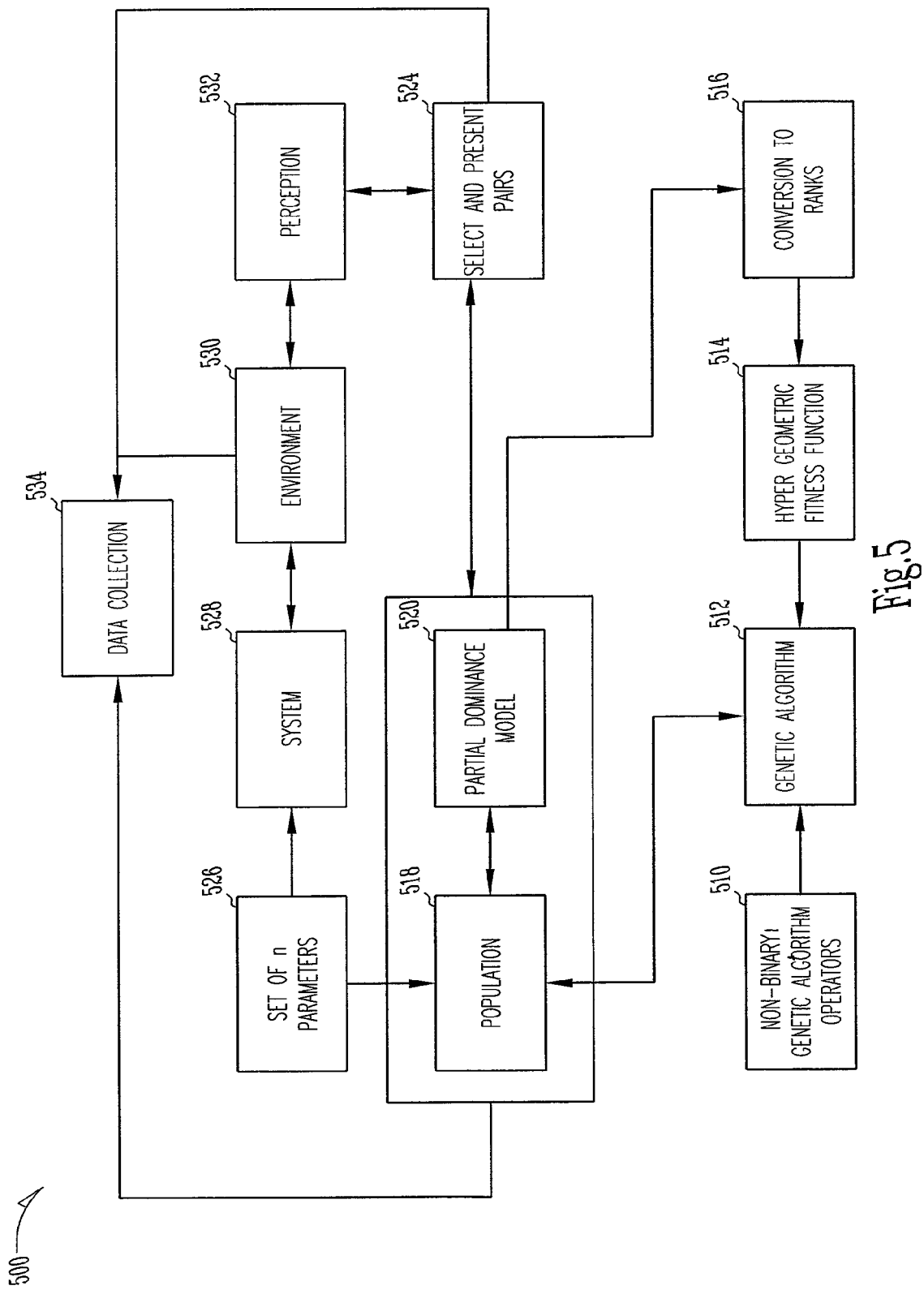
FIG. 5 is a block diagram of an alternate embodiment of a perceptual tuning system in accordance with the teachings of the present invention.

With reference to FIG. 5, another manner in which perceptual tuning in accordance with the present invention can be perceived is shown generally as 500. In this diagram, the system 528 would be the hearing aid 14 of the previous example.

The population 518 is the same as population 320 before. The partial dominance model contains an entry for each possible pair, without respect to presentation order, from population 518 that can be presented to the user. For example, parent set A can be presented with parent sets B, C, D, ... or X. Likewise, parent set B can be presented with parent sets C, D, ... or X, etc. With 5 parent sets, 10 possible pairs result.

The parent sets are presented to the user as the block "select and present pairs" 524. Once presented, the user indicates his/her preference and the preference is logged at data collection 534 along with which two parent sets were presented and what parameters they were constructed from.

The user bases his/her preference upon the perception 532 of the pair (of parent sets) as they are observed in environment 530. As is implied by their names, perception is the act or result of perceiving as done by the user and environment is the surroundings in which the sounds are perceived.

The one or more parameters from which the parent sets are constructed are contained in block 526, set of n parameters, with n being one or more. Again, the parameters are a function of the system in which they are used and therefore interact diagrammatically with the system 528.

The hierarchical ranking of the parent sets happens with conversion to ranks 516.

At 514, a hypergeometric fitness function assigns the probabilities of selection based upon the conversion to ranks 516.

Based on this information, the genetic algorithm 512, decides which pairs, if any, from the population 518 become presented to the users at 524. Non-binary GA operators such as mutation and crossover previously described supply input to the genetic algorithm to form child sets. Thereafter, the genetic algorithm replaces parent sets of the population 518 with newly created child sets to form a second population comprised of parent sets and child sets. The genetic algorithm also decides which sets from this second population get presented to the user at 524.

In further detail, the method of presenting pairs of parent sets and inferring ranks has four components. The first chooses which pair gets presented to the user. Then, the second draws all possible inferences based on the user's response and previous information. The third determines if another comparison is required. If another response is not required, the fourth is invoked and generates ranks for all the members of the population.

The data collection can also include information about environment 530 that can be provided to the genetic algorithm to assist in its selection of pairs for presentment and, ultimately, upon its convergence upon a solution set that perceptually tunes the system.

Finally, and representative of all embodiments herein, computer readable medium which can be accessed by a special or general purpose computer could be used to store information thereon, such as the genetic algorithm, the crossover operator, the mutation operator, the hypergeometric fitness function, the conversion to ranks, the population(s), the partial dominance model, and/or the parameters and/or other methods described that give way to being read by a computer. By way of example, and not limitation, such computer readable media can comprise ROM, RAM, EEPROM, CDs or other optical disk storage devices, floppy disks or other magnetic disk storage devices, or any other media now known or hereinafter invented which can be used to store the desired executable instructions or data fields of the exemplary information above. In a preferred embodiment, the stored information will be loaded into and for use in either the apparatus 16, the fully integrated hearing aid package 52 and/or the hearing aid 14. While these computer readable media are not shown in any figure, they are not required to be for they represent technologies well known to those skilled in the art and their description is not any better understood by referencing a particular figure.

CONCLUSION

Hearing aids and methods and apparatus for efficaciously audio fitting them have been described. More broadly, however, the perceptual tuning of any system has been described that uses genetic algorithms that, in turn, utilize user input selection from paired comparisons. Such user input selection from paired comparisons in an audio fitting of a hearing aid, for example, relates to a user comparing two audio settings and selecting a preferred one. Still even more broadly, the present invention has been described in terms of improved genetic algorithm crossover and mutation operators for use in a genetic algorithm that neither operate directly on a parametric value nor a string of bits representing the parametric value.

The present invention has been particularly shown and described with respect to certain preferred embodiment(s). However, it will be readily apparent to those of ordinary skill in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed is:

1. A method of audio fitting a hearing aid for a user using a genetic algorithm mutation operator on at least one parent set in a system population, the one parent set having a plurality of parent parameters, each the parent parameter being represented by a parent index, the method comprising:
    arranging the parent indexes in a range from a low the parent index to a high the parent index using input received from the user based on a paired comparison between parent sets;
    creating a mutation set having a plurality of mutation indexes;
    summing the mutation indexes and the parent indexes to form a summation set having a plurality of summation indexes; and
    fitting the hearing aid at least in part by reproducing at least one of the plurality of summation indexes in a child set.

2. The method according to claim 1, wherein one of the summation indexes is one of larger than the high parent index and smaller than the low parent index, wherein reproducing the summation indexes in the child set further comprises rounding the one of the summation indexes to one of the high parent index and the low parent index.

3. The method according to claim 1, wherein creating the mutation set further comprises generating the mutation indexes by generating a plurality of random variables and rounding each the random variable to a closest integer.

4. The method according to claim 3, wherein generating the plurality of random variables further comprises creating a normal distribution for the random variables.

5. The method of claim 1, wherein using a genetic algorithm mutation operator includes using the operator that does not operate directly on a parameter value.

6. The method of claim 1, wherein using a genetic algorithm mutation operator includes using the operator as part of a genetic algorithm to converge user preferences upon a single solution.

7. The method of claim 1, wherein using a genetic algorithm mutation operator includes using the operator for tuning a hearing aid.

8. The method of claim 1, wherein the range is linear.

9. A non-transitory computer readable medium having executable instructions for performing the steps of claim 1.

10. The computer readable medium of claim 9, wherein the medium includes at least one of a ROM, RAM, EEPROM, CD or other optical storage device, or floppy disk or other magnetic disk storage device.

11. The computer readable medium of claim 9, wherein the medium is included in a hearing aid.

12. A method of using a genetic algorithm operator on at least one parent set in a system population, the one parent set having a plurality of parent parameters, each parent parameter being represented by a parent index, the method comprising:

receiving an input from a user of a hearing aid, wherein the input includes a user selection from a paired comparison by the user between parent sets;

arranging the parent indexes in a linear range from a low parent index to a high parent index using the received input;

operating on the parent indexes, not on the parent parameters, with the genetic algorithm operator to obtain a child set, the child set having a child index position and at least one child parameter; and tuning the hearing aid at least in part by using the operator as part of a genetic algorithm to converge user preferences upon a single solution using the child set and the at least one parent set.

13. The method of claim 12, further comprising replacing one of the plurality of parent sets of the system population with the child set to form a second population.

14. The method of claim 12, wherein the genetic algorithm operator includes a genetic crossover operator.

15. The method of claim 12, wherein the genetic algorithm operator includes a genetic mutation operator.

16. The method of claim 12, wherein using a genetic algorithm operator includes using the operator for tuning a parameter of the hearing aid.

17. The method of claim 16, wherein using the operator for tuning a parameter of the hearing aid includes tuning gain of the hearing aid.

18. The method of claim 16, wherein using the operator for tuning a parameter of the hearing aid includes tuning compression ratio of the hearing aid.

19. The method of claim 16, wherein using the operator for tuning a parameter of the hearing aid includes tuning noise reduction of the hearing aid.

20. The method of claim 16, wherein using the operator for tuning a parameter of the hearing aid includes tuning feedback cancellation of the hearing aid.

21. A method of audio fitting a hearing aid using a genetic algorithm mutation operator on at least one parent set in a system population, the one parent set having a plurality of parent parameters, each the parent parameter being represented by a parent index wherein the parent indexes can be arranged in a range from a low the parent index to a high the parent index, comprising:

creating a mutation set having a plurality of mutation indexes;

summing the mutation indexes and the parent indexes to form a summation set having a plurality of summation indexes; and fitting the hearing aid at least in part by reproducing the summation indexes in a child set, wherein one of the summation indexes is one of larger than the high parent index and smaller than the low parent index, wherein forming the summation indexes include rounding the one of the summation indexes to one of the high parent index and the low parent index.

* * * * *